United States Patent

Jung

[11] Patent Number: 6,161,853
[45] Date of Patent: Dec. 19, 2000

[54] SUSPENSION SYSTEM FOR VEHICLES

[75] Inventor: Eun-wha Jung, Kyungki-do, Rep. of Korea

[73] Assignee: Hyundai Motor Company, Seoul, Rep. of Korea

[21] Appl. No.: 09/195,302

[22] Filed: Nov. 18, 1998

[30] Foreign Application Priority Data

Nov. 21, 1997 [KR] Rep. of Korea ................ 97-61679

[51] Int. Cl.⁷ ........................................... B60G 3/20
[52] U.S. Cl. .................. 280/124.136; 280/124.139; 280/124.179; 267/249; 267/254
[58] Field of Search ............... 280/124.134, 124.135, 280/124.136, 124.138, 124.139, 124.141, 124.179, 124.128, 124.13; 267/249, 254, 190, 191

[56] References Cited

U.S. PATENT DOCUMENTS

| | | | |
|---|---|---|---|
| 1,290,293 | 1/1919 | Morski | 280/124.13 |
| 2,026,018 | 12/1935 | Butterworth | 280/124.135 |
| 2,073,267 | 3/1937 | Prouty | 280/124.139 |
| 2,131,661 | 9/1938 | Heyermans et al. | 280/124.136 |
| 2,913,253 | 11/1959 | Taber | 280/124.102 |
| 3,400,947 | 9/1968 | Cottrill | 280/86.751 |
| 5,839,742 | 11/1998 | Holt | 280/124.134 |

*Primary Examiner*—Lanna Mai
*Assistant Examiner*—El Gort
*Attorney, Agent, or Firm*—Christie, Parker & Hale, LLP

[57] ABSTRACT

Disclosed is a suspension system for vehicles including a wheel carrier for rotatably supporting a wheel; an upper control arm having a first end connected to an upper end of the wheel carrier and a second end pivotally connected to a frame of the vehicle; a lower control arm having a first end connected to a lower end of the wheel carrier and a second end extending toward the frame of the vehicle; and a damper for converting an up-and-down motion of the lower control arm caused by shock transmitted from a road surface into a linear motion in a longitudinal direction of the vehicle and cushioning the linear motion, the damper being mounted on a side member and connected to the lower control arm.

8 Claims, 11 Drawing Sheets

SUSPENSION SYSTEM FOR VEHICLES

BACKGROUND OF THE INVENTION (a) Field of the Invention

The present invention relates to a suspension system for vehicles. More particularly, the present invention relates to a suspension system for vehicles that can be mounted utilizing a minimal amount of space and in which irregularities in the road surface are not directly transmitted to a frame of the vehicle.

(b) Description of the Related Art

The suspension system in vehicles improves ride comfort by absorbing shocks received through the wheels when the same encounter surface irregularities in the road. In addition to this main capability, suspension systems must also be designed to provide directional control, ease of handling, safety and stability.

Suspension systems comprise one or more control arms connecting the frame to the wheels, and springs and shock absorbers to absorb shocks transmitted from the road surface in the vertical direction. Accordingly movement of the wheels in relation to the frame is fully supported such that shocks and vibrations resulting from surface irregularities of the road are absorbed, and stability is provided when steering the vehicle.

The suspension system must satisfy three basic criteria: (1) ability to absorb shocks caused by road surface irregularities to provide ride comfort to the driver and passengers; (2) ability to prevent swaying of the vehicle during cornering, acceleration and braking; and (3) ability to maintain an appropriate level of vertical load on a surface of the wheel contacting the road such that vehicle stability is provided while turning, braking and accelerating, even when surface irregularities in the road are encountered.

To improve the above capabilities, those in the industry have put forth much effort into overall improvement and refinement of the suspension system, and in the development of improved springs and damping mechanisms.

The single control arm suspension system, also called the McPherson strut suspension system, is one example of a conventional suspension system. As shown in FIG. 11, the conventional strut-type suspension system comprises a strut assembly 212 consisting of a shock absorber 204 and a coil spring 202, the coil spring 202 surrounding the shock absorber 204; an insulator 206 interposed between a vehicle body 208 and an upper end of the strut assembly 212; a wheel carrier 210 fixed to a lower end of the shock absorber 204 and to which a wheel is rotatably mounted; and a lower control arm 216 which connects a lower portion of the wheel carrier 210 to a sub-frame 214.

With this structure, upward movement of the wheel and wheel carrier 210 caused by surface irregularities in the road is absorbed by the strut assembly 212. Accordingly, only a minimal amount of shock is transmitted to the vehicle body 208 and the frame 214.

However, problems result from such mounting of the strut assembly 212 in a vertical or slightly slanted state. That is, because of this vertical or near-vertical mounting of the strut assembly 212, a substantial amount of space is used by the suspension system. As a result, the vehicle body 208 must be large to provide sufficient clearance for the suspension system to operate. This acts to reduce the size of the engine and passenger compartments and limits the free layout design of the suspension system.

Further, as a substantial load is concentrated on the area of the vehicle body 208 to which the upper end of the strut assembly 212 is mounted, this area can weaken and eventually become damaged from the stress received. This results in the generation of vibrations such that handling and ride comfort are negatively affected, and noise is generated.

To remedy the above problem, some conventional configurations reinforce this area of the wheel carrier 208 to which the strut assembly 212 is mounted. However, such an addition increases overall manufacturing costs and the weight of the vehicle.

In the above, although the strut-type suspension system was given by way of example, the same drawbacks apply to all vertically-mounted suspension systems including the double wishbone suspension system and the multi-link type suspension system.

SUMMARY OF THE INVENTION

The present invention has been made in an effort to solve the above problems.

It is an object of the present invention to provide a suspension system for vehicles that can be mounted utilizing a minimal amount of space while maintaining its shock-absorbing and stabilizing capabilities such that the engine and passenger compartments can be enlarged.

It is another object of the present invention to provide a suspension system for vehicles in which shocks received from irregularities in the road surface are not directly transmitted to a vehicle body, thereby preventing damage to the vehicle body and improving handling and ride comfort.

It is still another object of the present invention to provide a suspension system for vehicles in which adjustments in shock-absorbing and clearances levels can be made to enable wide application of the suspension system to various types of vehicles.

To achieve the above objects, the present invention provides a suspension system for vehicles including a wheel carrier for rotatably supporting a wheel; an upper control arm having a first end connected to an upper end of the wheel carrier and a second end pivotally connected to a frame of the vehicle; a lower control arm having a first end connected to a lower end of the wheel carrier and a second end extending toward the frame of the vehicle; and a damper for converting an up-and-own motion of the lower control arm caused by shock transmitted from a road surface into a linear motion in a longitudinal direction of the vehicle and cushioning the linear motion the damper being mounted on a side member and connected to the lower control arm.

According to a feature of the present invention, a shock absorber is connected to the lower control arm and to the frame of the vehicle.

According to another feature of the present invention, the damper can be fixedly mounted to an exterior of a side member of the frame, or can be fixedly mounted within the side member of the frame.

In one aspect, the damper includes an upper casing fixedly mounted to a side member of the frame, the upper casing being hollow; a lower casing integrally formed downward from a right end portion of the upper casing and having a bottom end bent toward the second end of the lower control arm, the lower casing being hollow; a first shaft fixedly connected to the second end of the lower control arm and extending into the bottom end of the lower casing, a first gear being formed on an end of the first shaft extending into the lower casing; a second shaft extending along a length of the lower casing and into the upper casing, and having a second gear formed on a bottom end thereof to mesh with the first gear of the first shaft and a pinion formed on a top end thereof; an elastic member provided in a leftward end of the upper casing; and a rack bar having a stopper on a left end and a rack portion on a right end, the stopper contacting a right end of the elastic member and the rack portion meshing with the pinion of the second shaft.

According to another feature of the present invention, the elastic member is a coil spring.

According to yet another feature of the present invention, the damper further comprises an inner casing mounted in the leftward end of the upper casing, the elastic member being provided in the inner casing.

According to still yet another feature of the present invention, the damper further comprises a disc-shaped piston of a predetermined thickness provided between the elastic member and the stopper of the rack bar.

In another aspect, the damper includes an upper casing fixedly mounted to a side member of the frame, the upper casing being hollow; a lower casing integrally formed downward from a right end portion of the upper casing and having a bottom end bent toward the lower control arm, the lower casing being hollow; a beam fixedly mounted on the lower control arm and extending into the bottom end of the lower casing, a first gear being formed on an end of the first shaft extending into the lower casing; a first shaft extending along a length of the lower casing and into the upper casing, and having a second gear formed on a bottom end thereof to mesh with the first gear of the beam and a third gear formed on a top end thereof, a fourth gear rotating on a shaft mounted to an interior of the damper and meshed with the third gear; a second shaft provided extending between the lower casing and the upper casing, and having a fifth gear on a lower end thereof meshing with the fourth gear and a pinion on an upper end thereof; an elastic member provided in a leftward end of the upper casing; and a shock absorber mounted in the upper casing and having a damper rod extending in a leftward direction to be fixed to a left end of the upper casing and a rack bar extending in a rightward direction such that a rack portion formed thereon meshes with the pinion of the second shaft, the damping rod of the shock absorber extending through a middle of the elastic member.

According to a feature of the present invention, the elastic member is a coil spring.

According to another feature of the present invention, a cavity is formed between the upper casing and the lower casing, the third gear of the first shaft, the fourth gear, and the fifth gear of the second shaft being provided in the cavity.

According to yet another feature of the present invention, a guide member supports the shock absorber to enable the same to slide within the upper casing and prevent the shock absorber from sliding in a vertical direction.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
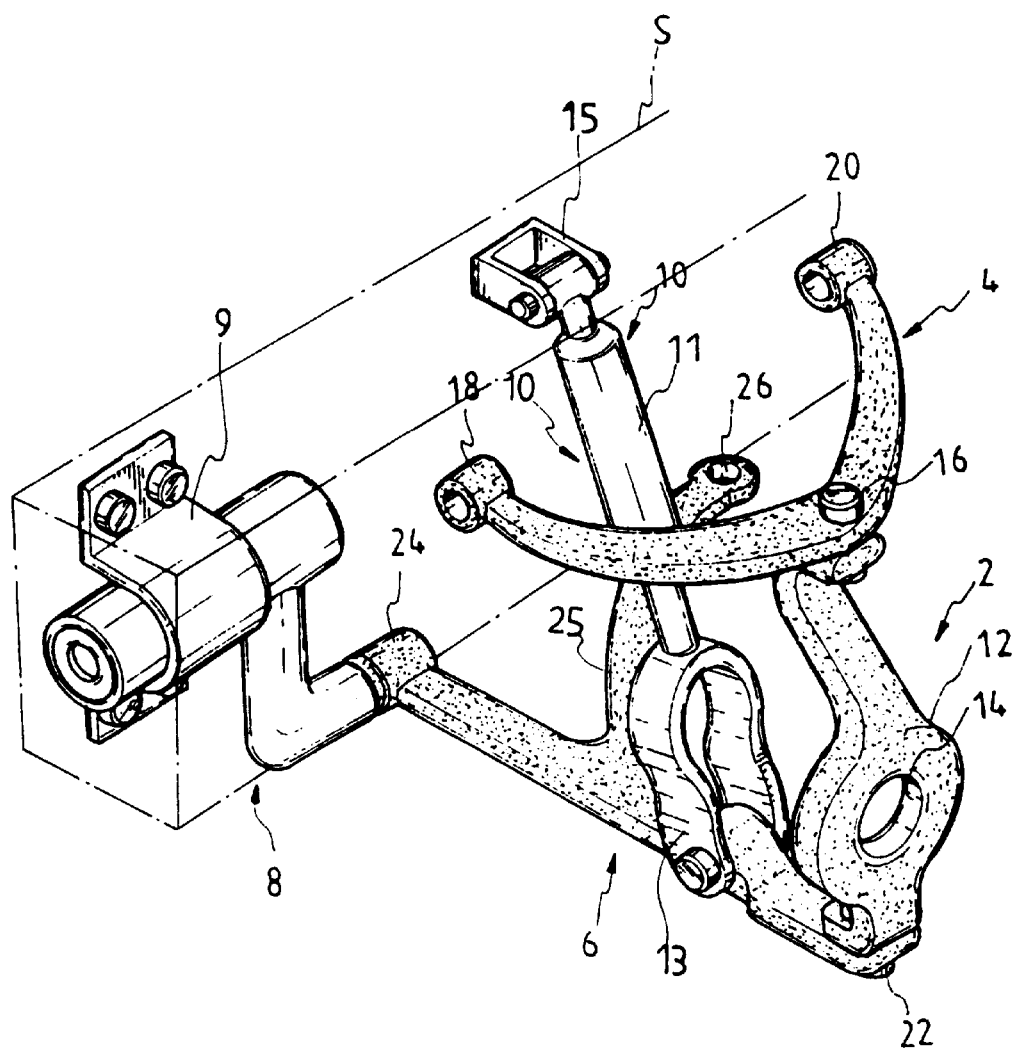
FIG. 1 is a perspective view of a suspension system according to a first preferred embodiment of the present invention.

Preferred embodiments of the present invention will now be described in detail with reference to the accompanying drawings.

Certain terminology will be used in the following description for convenience and reference only and will not be limiting. The words "right", "left", "upper" and "lower" will designate directions in the drawings to which reference is made.

Figure 2:
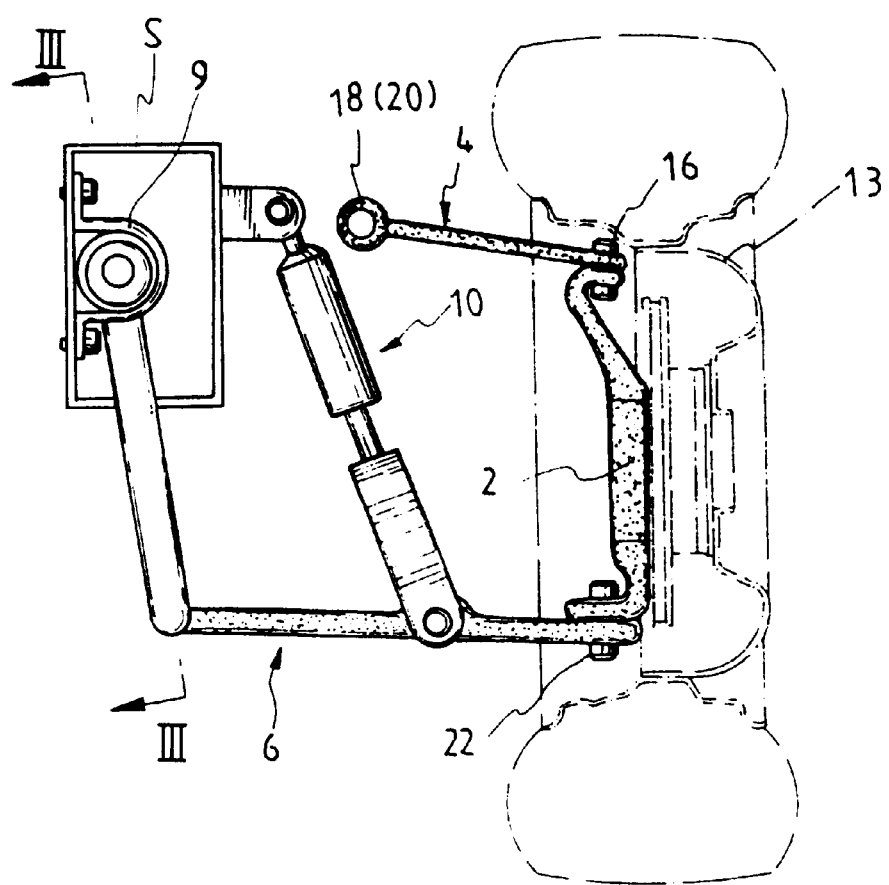
FIG. 2 is a front view of the suspension system shown in FIG. 1.

FIG. 1 shows a perspective view of a suspension system according to a first preferred embodiment of the present invention, and FIG. 2 is a front view of the suspension system shown in FIG. 1.

As shown in the drawings, the suspension system according to the first preferred embodiment of the present invention comprises a wheel carrier 2, an upper control arm 4 connecting an upper end of the wheel carrier 2 to a frame of the vehicle, a lower control arm 6 connecting a lower end of the wheel carrier 2 to the frame, and first and second dampers 8 and 10 which absorb shocks and vibrations received as a result of surface irregularities in the road.

The wheel carrier 2 rotatably supports a wheel 13 (see FIG. 2) on a support plate 12 thereof. Further, a hole 14 is formed in a center of the support plate 12 of the wheel carrier 2 such that, in the case where the suspension system is provided to drive wheels, a drive shaft (not shown) is inserted through the hole 14 of the support plate 12 to drive the wheel 13.

The upper control arm 4 connects the wheel carrier 2 to the frame. The upper control arm 4 is parabolic, and has a center connecting portion 16 provided approximately at its vertex and end connecting portions 18 and 20 formed on opposing ends of the upper control arm 4. The center connecting portion 16 is coupled to the upper end of the wheel carrier 2 using, for example, a ball-joint assembly, and the end connecting portions 18 and 20 are joined to the frame through, for example, bushing assemblies. With regard to the end connecting portions 18 and 20, it is possible to use other coupling structures that enable pivoting of the wheel carrier 2 in a vertical direction.

The lower control arm 6 extends from the wheel carrier 2 to the first damper 8 and includes an appendage 25 that branches off in a direction away from the first damper 8. The lower control arm 6 includes a first end 22 connected to the lower end of the wheel carrier 2 through, for example, a ball-joint assembly; a second end 24 connected to the first damper 8; and a third end 26 provided at an extremity of the appendage 25 and connected to the frame using, for example, a ball-joint assembly. The coupling of the second end 24 of the lower control arm 6 will be described in more detail hereinafter.

The second damper 10 is connected to the lower control arm 6 and a side member (S) of the frame. The second damper 10 includes a shock absorber 11, a lower connector 13 coupling the shock absorber 11 to the lower control arm 6, and an upper connector 15 joining the shock absorber 11 to the side member (S) of the frame. The lower connector 13 is connected to the lower control arm 6 at a position inward from the first end 22 of the same. With this configuration, the shock absorber 11 can be significantly shorter than that used in the conventional vertically-mounted suspension system. As the structure and operation of the shock absorber 11 is substantially identical to that used in the prior art, a more detailed description thereof will be omitted herein.

The first damper 8 is clamped to the side member (S) of the frame using, for example, a U-shaped clamp 9. The clamp 9 surrounds part of an exterior of the first damper 8 and is fixed to the side member (S). As shown in the drawings, the clamped portion of the first damper 108 is provided within the side member (S). However, the present invention is not limited to this structure and it is possible to mount the first damper 108 to an exterior of the side member (S) of the frame. Further, it is possible to use other mounting configurations to couple the first damper 8 to the side member (S) of the frame as long as the first damper 8 is securely fasted thereon.

Figure 3:
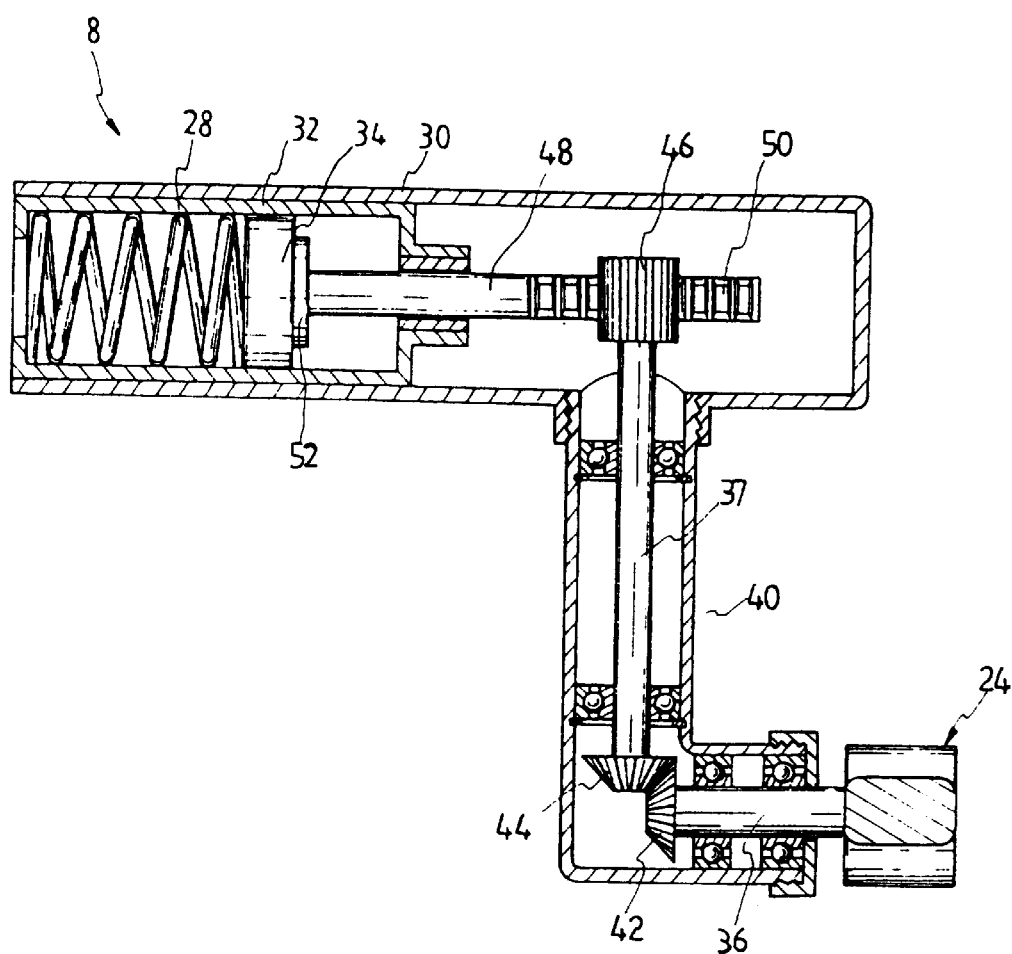
FIG. 3 is a sectional view taken along line III—III of FIG. 2.

FIG. 3 shows a sectional view taken along line III—III of FIG. 2. As shown in the drawing, the first damper 8 is tubular and its exterior is defined by an upper casing 30 and a lower casing 40, the upper and lower casings 30 and 40 being integrally formed. The upper casing 30 is mounted to the side member (S) of the frame by the clamp 9 (see FIGS. 1 and 2). The lower casing 40 extends downward from the upper casing 30 at a right end thereof, and a lower end of the lower casing 40 bends and extends in a rightward direction toward the second end 24 of the lower control arm 6 such that an L-shape is formed by the lower casing 40.

Extending from the second end 24 of the lower control arm 6 and entering the lower casing is a first shaft 36. One end of the first shaft 36 is fixedly mounted in the second end 24 of the lower control arm 6, and a first gear 42 is formed on an opposite end of the first shaft 36, the first gear 42 being, for example, a bevel gear. A second shaft 37 is provided extending across a length of the lower casing 40, the second shaft 37 protruding into the upper casing 30 and ending at a point corresponding to where the lower casing 40 bends. A second gear 44 is formed on a lower end of the second shaft 37 to mesh with the first gear 42 of the first shaft 36, the second gear 44 being, for example, a bevel gear. A pinion 46 is formed on an upper end of the second shaft 37.

Fixedly mounted in a leftward end of the upper casing 30 of the first damper 8 is an inner casing 32. A coil spring 28 is provided in the inner casing 32, and a piston 34 is positioned on a rightward end of the coil spring 28 such that the coil spring 28 provides biasing force against the piston 34 in a rightward direction.

A rack bar 48 is slidably provided in the upper casing 30. A rack portion 50 of a predetermined length is formed on a right end of the rack bar 48 and a stopper 52 is formed on a left end of the same. The rack portion 50 is meshed with the pinion 46 of the second shaft 37, and the stopper 52 contacts the piston 34. Here, the piston 34 is maintained in close contact with the stopper 52 by the biasing force of the coil spring 28.

With the above configuration, upward movement of the wheel 13 on the wheel carrier 2 is transmitted via the lower control arm 6. (see FIGS. 1 and 2) to the first damper 8 to be absorbed by the coil spring 28 provided therein. Also, downward force is applied on the wheel 13 even when the same follows a downward depression in the road by the transmission of the biasing force of the coil spring 28 such that sufficient vertical load on the surface of the wheel 13 contacting the road is maintained, thereby providing vehicle stability. Both the cushioning and maintaining of downward force on the wheel 13 is assisted by the second damper 10.

The operation of the first damper 8 will be described in more detail hereinafter.

Figure 4:
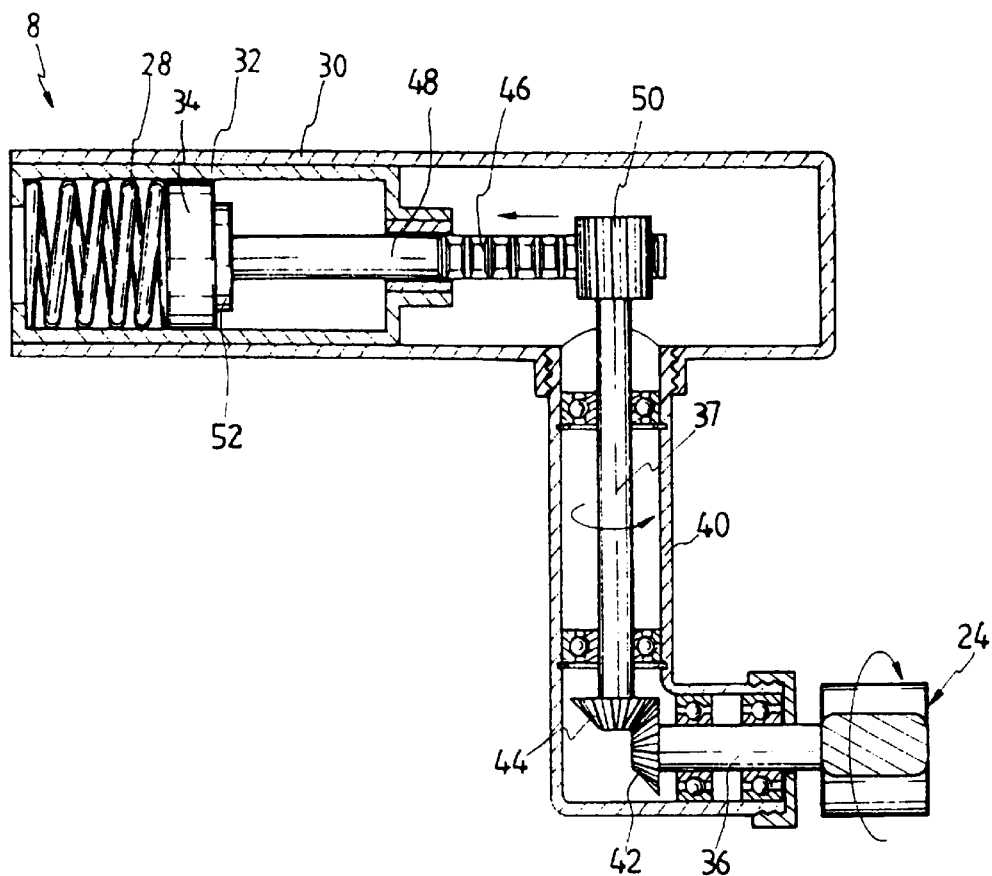
FIG. 4 is a sectional view similar to FIG. 3 for illustrating the operation of a first damper during a jounce phase.

FIG. 4 is a sectional view similar to FIG. 3 for illustrating the operation of the first damper 8 during a jounce phase. Referring to FIGS. 1, 2 and 4, when the wheel 13 encounters a bump in the road causing the same to travel upward, the wheel carrier 2 and the lower control arm 6 also move in the upward direction. As a result, the first shaft 36 fixedly provided in the second end 24 of the lower control arm 6 rotates in a direction as indicated by the arrow in the drawing.

Accordingly, the second shaft 37 rotates in a counter-clockwise direction (in the drawing) such that the pinion 46 of the second shaft 37 moves the rack bar 48 in a direction toward the coil spring 28 as shown by the arrow. That is, by the meshing of the pinion 46 of the second shaft 37 with the rack portion 50 of the rack bar 48, the counterclockwise rotation of the second shaft 37 acts to move the rack bar 48 in a leftward direction. As a result, the stopper 52 of the rack bar 48 pushes the piston 34 against biasing force of the coil spring 28 such that the same is compressed. This acts to cushion the bounce of the wheel 13 when the same encounters irregularities in the surface of the road that force the wheel 13 upward.

Figure 5:
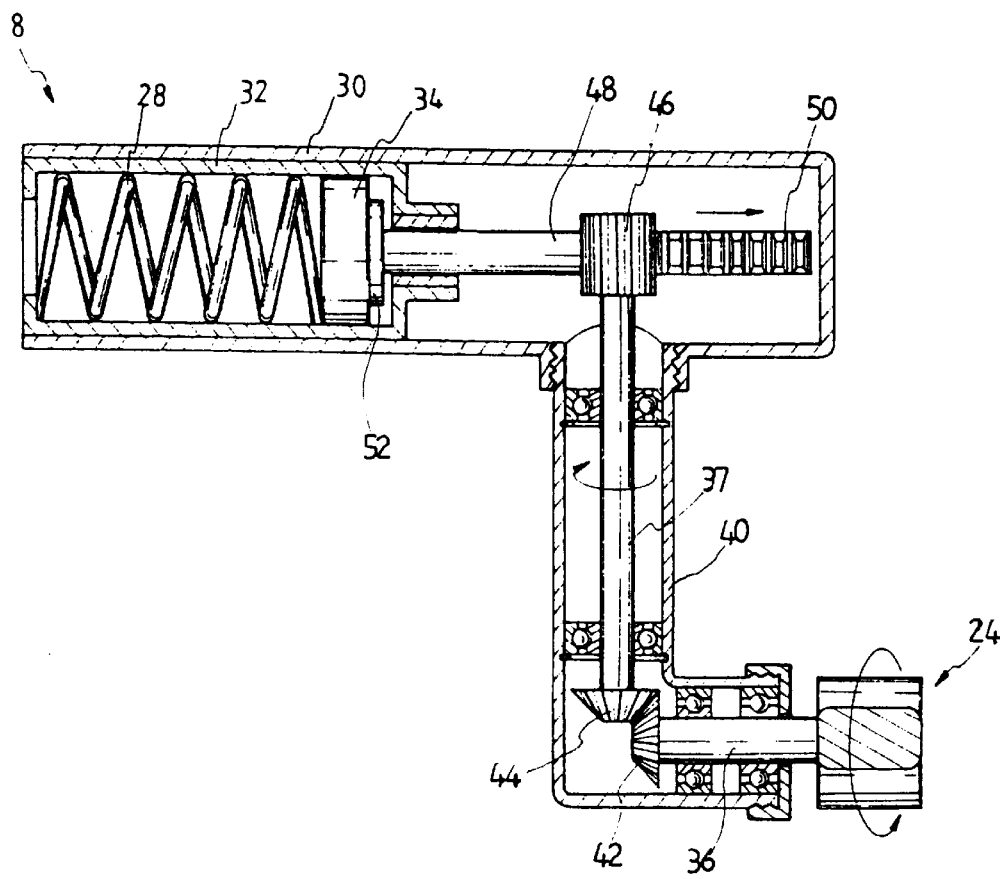
FIG. 5 is a sectional view similar to FIG. 3 for illustrating the operation of the first damper during a rebound phase.

FIG. 5 shows a sectional view similar to FIG. 3 for illustrating the is operation of the first damper 8 during a rebound phase. Referring to FIGS. 1, 2 and 5, when the wheel 13 travels downward as a result of a depression in the surface of the road, the wheel carrier 2 and the lower control arm 6 move downward together with the wheel 13. Accordingly, the second end 24 of the lower control arm 6 rotates in a direction as shown by the arrow in the drawing such that the first damper 8 operates in an fashion opposite to that described with reference to FIG. 4. As a result, the coil spring 28 rebounds and provides additional force to move the rack bar 48 in a rightward direction such that downward pressure is given to the wheel 13. Therefore, vertical load is applied on the surface of the wheel 13 contacting the road.

The above operation of the first damper 8 is continuously repeated as the vehicle is being driven, thereby fully absorbing shocks and providing stability as a result of the vertical load maintained on the surface of the wheel. As mentioned above, the operation of the first damper described with reference to FIGS. 4 and 5 is aided by the second damper 10.

Different springs with differing spring rates can be used for the coil spring 28 of the first damper 8 to vary the level of shock-absorbing strength and clearance of the vehicle. Accordingly, the first damper 8 can be made to be compatible to many different kinds of vehicles with different weights, and shock-absorbing and stability requirements.

Figure 6:
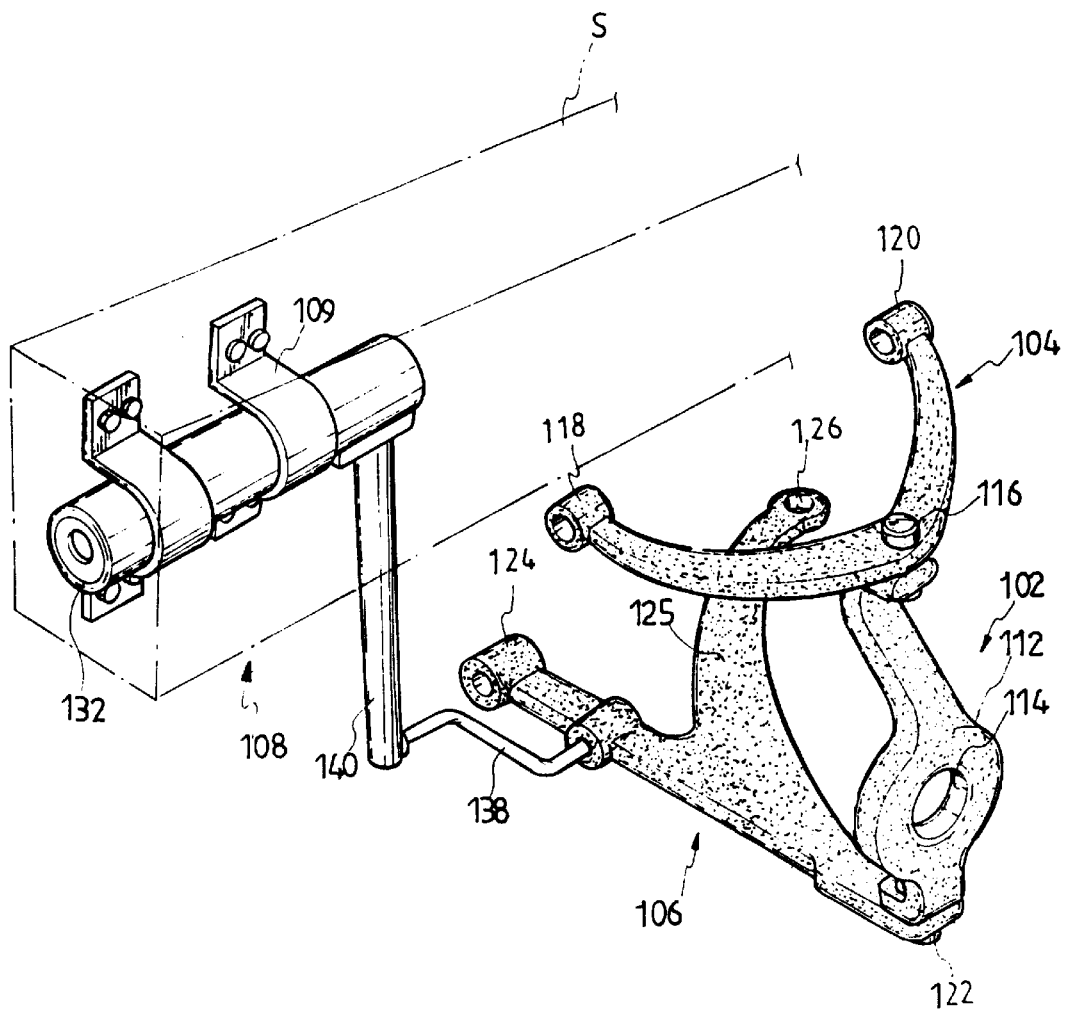
FIG. 6 is a perspective view of a suspension system according to a second preferred embodiment of the present invention.
Figure 7:
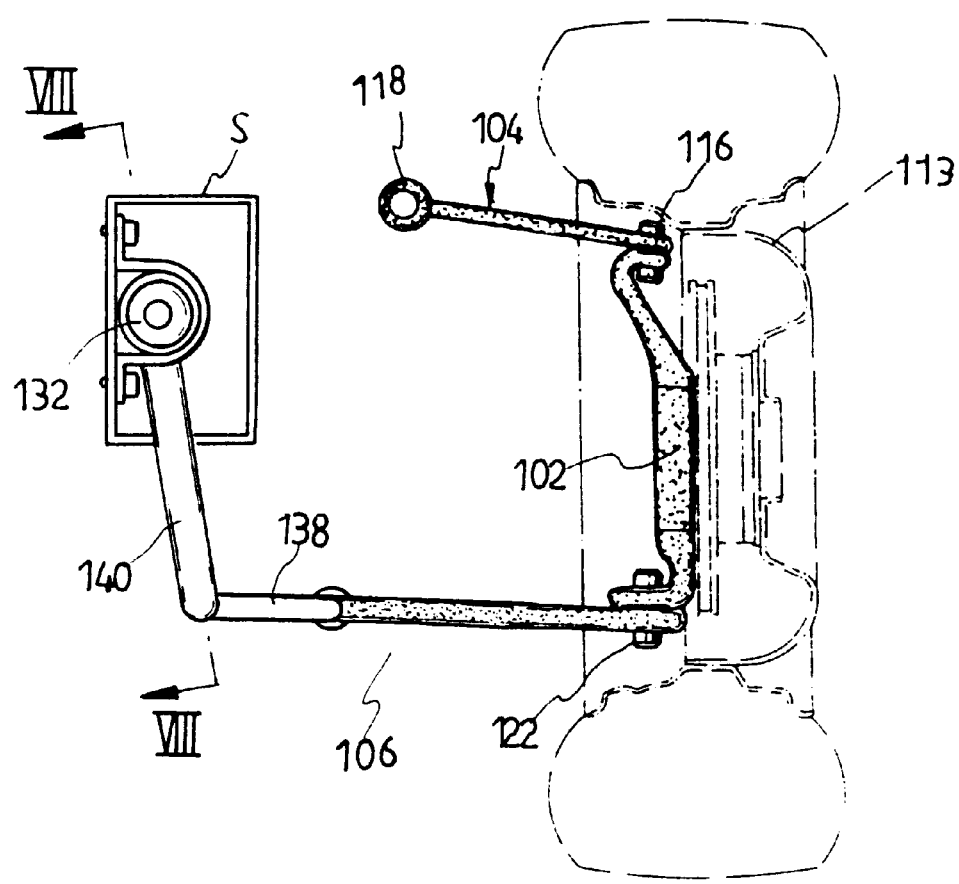
FIG. 7 is a front view of the suspension system shown in FIG. 6.

FIG. 6 is a perspective view of a suspension system according to a second preferred embodiment of the present invention, and FIG. 7 is a front view of the suspension system shown in FIG. 6.

As shown in the drawings, the suspension system according to the second preferred embodiment of the present invention comprises a wheel carrier 102, an upper control arm 104 connecting an upper end of the wheel carrier 102 to the frame of the vehicle, a lower control arm 106 connecting a lower end of the wheel carrier 102 to the frame, and a damper 108 which absorbs shocks and vibrations received from surface irregularities in the road.

The wheel carrier 102 rotatably supports a wheel 113 (see FIG. 7) on a support plate 112 thereof. Further, a hole 114 is formed in a center of the support plate 112 of the wheel carrier 102 such that, in the case where the suspension system is provided supporting drive wheels, a drive shaft (not shown) is inserted through the hole 114 of the support plate 112 to drive the wheel 113.

The upper control arm 104 connects the wheel carrier 102 to the frame. The upper control arm 104 is parabolic, and has a center connecting portion 116 provided approximately at its vertex and end connecting portions 118 and 120 formed on opposing ends of the upper control arm 104. The center connecting portion 116 is coupled to the upper end of the wheel carrier 102 using, for example, a ball-joint assembly, and the end connecting portions 118 and 120 are joined to the frame through, for example, bushing assemblies. With regard to the end connecting portions 118 and 120, other coupling structures enabling pivoting of the wheel carrier 2 in a vertical direction can be used.

The lower control arm 106 extends from the wheel carrier 102 to be connected to the frame, and includes an appendage 125 that branches off in a rightward direction. The lower control arm 106 includes a first end 122 connected to the lower end of the wheel carrier 102 through, for example, a ball-joint assembly; a second end 124 connected to the frame using, for example, a bushing assembly, and a third end 126 provided at an extremity of the appendage 125 and connected to the frame using, for example, a ball-joint assembly.

In addition, a bar 138 is provided extending from the lower control arm 106 to the damper 108. One end of the bar 138 is fixedly connected to the lower control arm 106 and the other end of the bar 138 is inserted in the damper 108. The bar 138 is bent two times at substantially right angles such that upward and downward movement of the lower control arm 106 is transmitted as counterclockwise and clockwise rotation, respectively, with respect to the front view of FIG. 7.

The first damper 108 is fixedly mounted to the side member (S) of the frame using, for example, a U-shaped clamp 109 The clamp 109 surrounds part of an exterior of the first damper 108 and is fixed to the side member (S). As shown in the drawings, the clamped portion of the first damper 108 is provided within the side member (S). However, the present invention is not limited to this structure and it is possible to mount the first damper 108 to the exterior of the side member (S) of the frame. In addition, it is possible to use other mounting configurations to couple the first damper 8 to the side member (S) of the frame.

Figure 8:
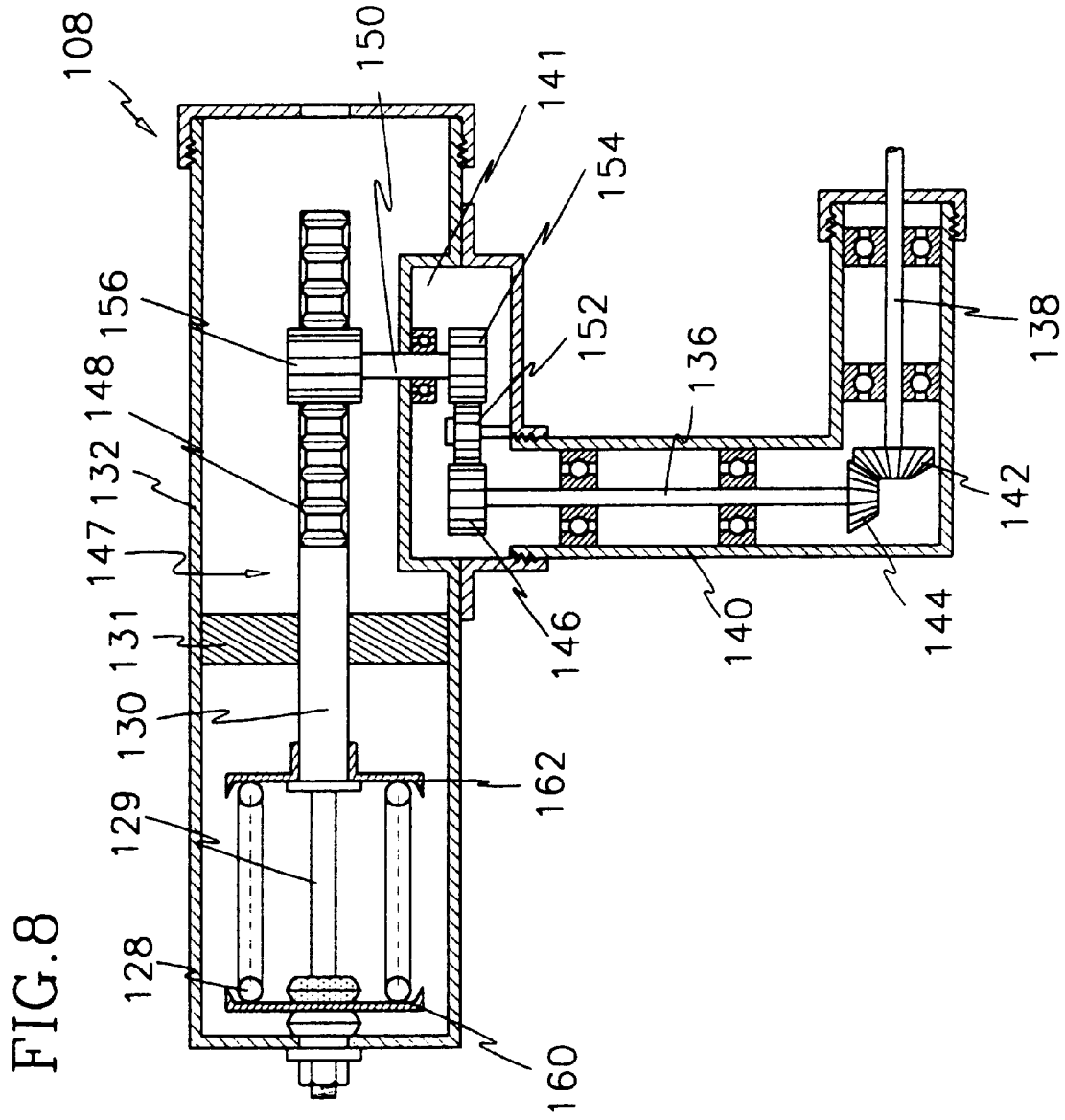
FIG. 8 is a sectional view taken along line VIII—VIII of FIG. 7.

FIG. 8 shows a sectional view taken along line VIII—VIII of FIG. 7. As shown in the drawing, the first damper 108 is tubular and its exterior is defined by an upper casing 132 and a lower casing 140, the upper and lower casings 132 and 140 being integrally formed. The upper casing 132 is mounted to the side member (S) of the frame by the clamp 109 (see FIGS. 6 and 7), and the lower casing 140 extends downward from the upper casing 132 at a right end thereof. A lower end of the lower casing 140 bends and extends in a rightward direction toward the lower control arm 106 such that an L-shape is formed by the lower casing 140. Further, a cavity 141 is formed between the lower casing 140 and the upper casing 132, the use of which will be described hereinafter.

The bar 138 connected to the lower control arm 6 extends into the damper 108. That is, the bar 138 extends into the lower casing 140 and ends; at a position corresponding to where the same bends. A first gear 142 is formed on the end of the bar 138 inserted in the lower casing 140, the first gear 142 being, for example, a bevel gear. A first shaft 136 is provided extending across a length of the lower casing 140 and ends at a position in the cavity 141 formed between the lower casing 140 and the upper casing 132. A second gear 144 is formed on a lower end of the first shaft 136 to mesh with the first gear 142 of the bar 138, the second gear 44 being, for example, a bevel gear. A third gear 146 is formed on an upper end of the first shaft 36.

Provided adjacent to the third gear 146 of the first shaft 136 in the cavity 141 is a fourth gear 152. The fourth gear 152 is meshed with the third it gear 146, and these two gears 146 and 152 rotate in opposite directions as a result of their adjacent positioning. In addition, provided extending from the cavity 141 and into the upper casing is a second shaft 150. A fifth gear 154 is formed on a lower end of the second shaft 150 and a pinion is formed on an upper end of the same. The fifth gear 154 is provided adjacent to and meshing with the fourth gear 152. With the fourth gear 152 provided between the third gear 146 and the fifth gear 154, the latter two gears 146 and 154 rotate in the same direction.

Fixedly provided on a leftward end of the upper casing 132 is a first spring support 160. One end of a coil spring 128 is supported by the first spring support 160, and the other end of the coil spring 128 is supported by a second spring support 162. The second spring support 162 is integrally formed on a shock absorber 130. That is, the shock absorber 130 extends across a length of the upper casing 132 from the rightward end of the coil spring 128, which the shock absorber 130 supports with the second spring support 162, to approximately the right end of the upper casing 132.

A rack bar 147 is formed on a right end of the shock absorber 130, and a rack portion 148 of a predetermined length which meshes with the pinion 156 of the second shaft 150 is formed on the rack bar 147. In addition, a damping rod 129 of the shock absorber 130 extends from a middle area of the shock absorber 130, approximately where the second spring support 162 is formed, passes through a middle of the coil spring 128 and the first spring support 160, and is fixed to the left end of the upper casing 132. Also, a guide member 131 is provided at a portion of the shock absorber 130 between the second spring support 162 and the rack bar 147. The guide member 131 acts to support the shock absorber 130 as it undergoes sliding motion within the upper casing 132, and to prevent the shock absorber 130 from moving in a vertical direction therein.

With the above configuration, upward movement of the wheel 113 on the wheel carrier 102 is transmitted via the bar 138 mounted on the lower control arm 6 (see FIGS. 6 and 7) to the damper 108 to be absorbed by the shock absorber 130 and the coil spring 128 provided therein. Also, downward force is applied on the wheel 113 even when the same follows a downward depression in the road by the transmission of the biasing force of the shock absorber 130 and the coil spring 128 such that sufficient vertical load on the surface of the wheel 113 contacting the road is maintained, thereby providing vehicle stability.

The operation of the first damper 8 will be described in more detail hereinafter.

Figure 9:
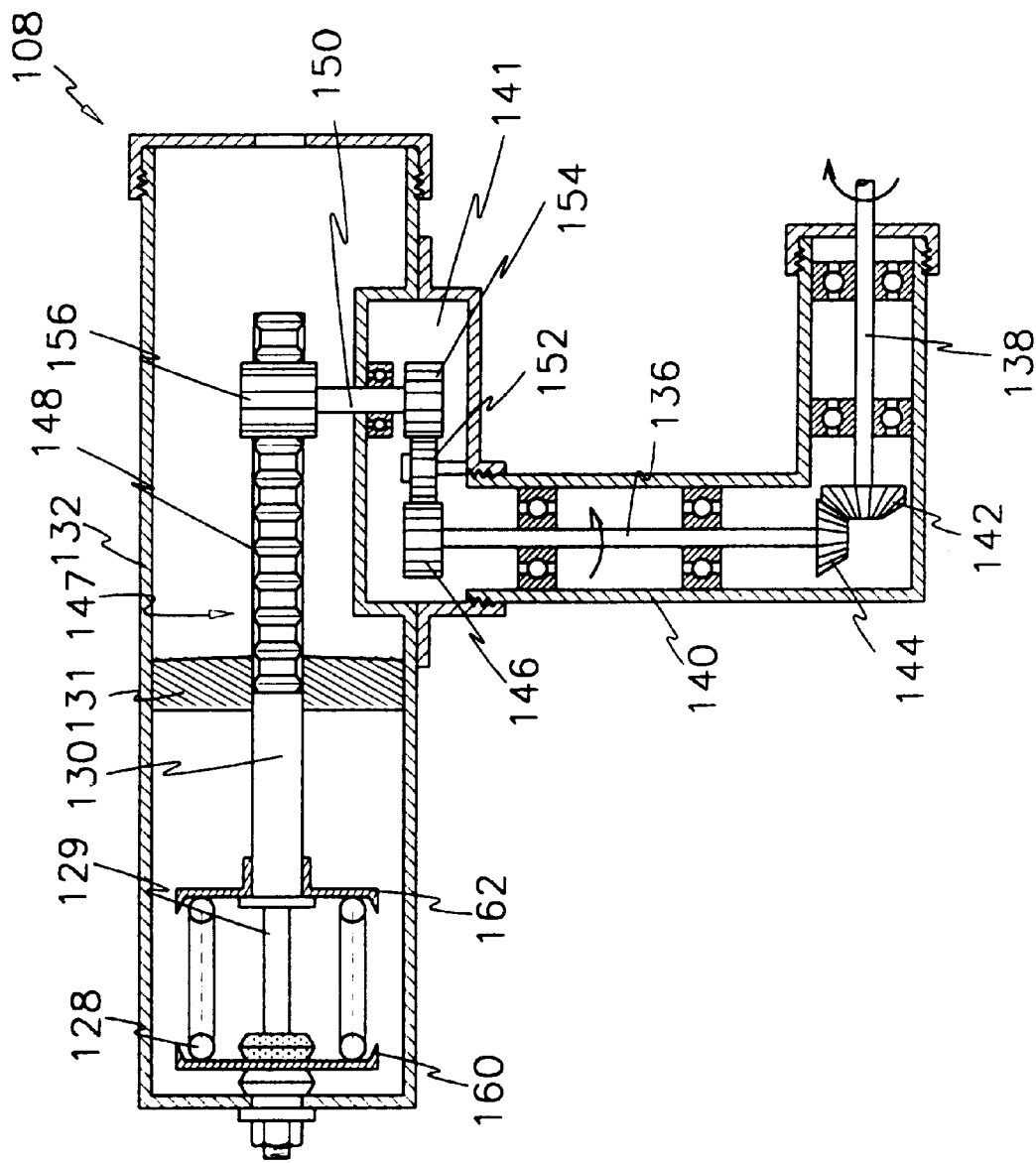
FIG. 9 is a sectional view similar to FIG. 8 for illustrating the operation of a damper during a jounce phase.

FIG. 9 shows a sectional view similar to FIG. 8 for illustrating the operation of the damper 108 during a jounce phase. Referring to FIGS. 6, 7 and 9, when the wheel 113 encounters a bump in the road causing the same to travel upward, the wheel carrier 102 and the lower control arm 106 also move in the upward direction. As a result, the end of the bar 138 connected to the lower control arm 106 also moves in an upward direction such that the end of the bar 138 provided in the lower casing 140 of the damper 108 rotates in a direction as shown by the arrow in FIG. 9.

Accordingly, the first gear 142 of the bar 138 rotates the second gear 144 of the first shaft 136 such that the same rotates in a clockwise direction (in FIG. 9). As a result, the clockwise rotation of the third gear 146 of the first shaft 136 rotates the adjacent fourth gear 152 in a counterclockwise direction (in FIG. 9). This, in turn, rotates the fifth gear 154 of the second shaft 150 in a clockwise direction (in the drawing) such that the pinion 156 of the second shaft 150 moves the shock absorber 130 in a leftward direction. That is, by the meshing of the pinion 156 of the second shaft 150 on the rack portion 148 of the rack bar 147 of the shock absorber 130, the clockwise rotation of the second shaft 150 acts to move the shock absorber 130 in a leftward direction.

As a result of the above, the second spring support 162 of the shock absorber 130 pushes against the biasing force of the coil spring 128 to compress the same, and the damping rod 129 of the shock absorber 130 is forced in to the same such that the cushioning action of the shock absorber 130 is operated. This acts to absorb the bounce of the wheel 113 when the same encounters irregularities in the surface of the road that force the wheel 113 upward.

Figure 10:
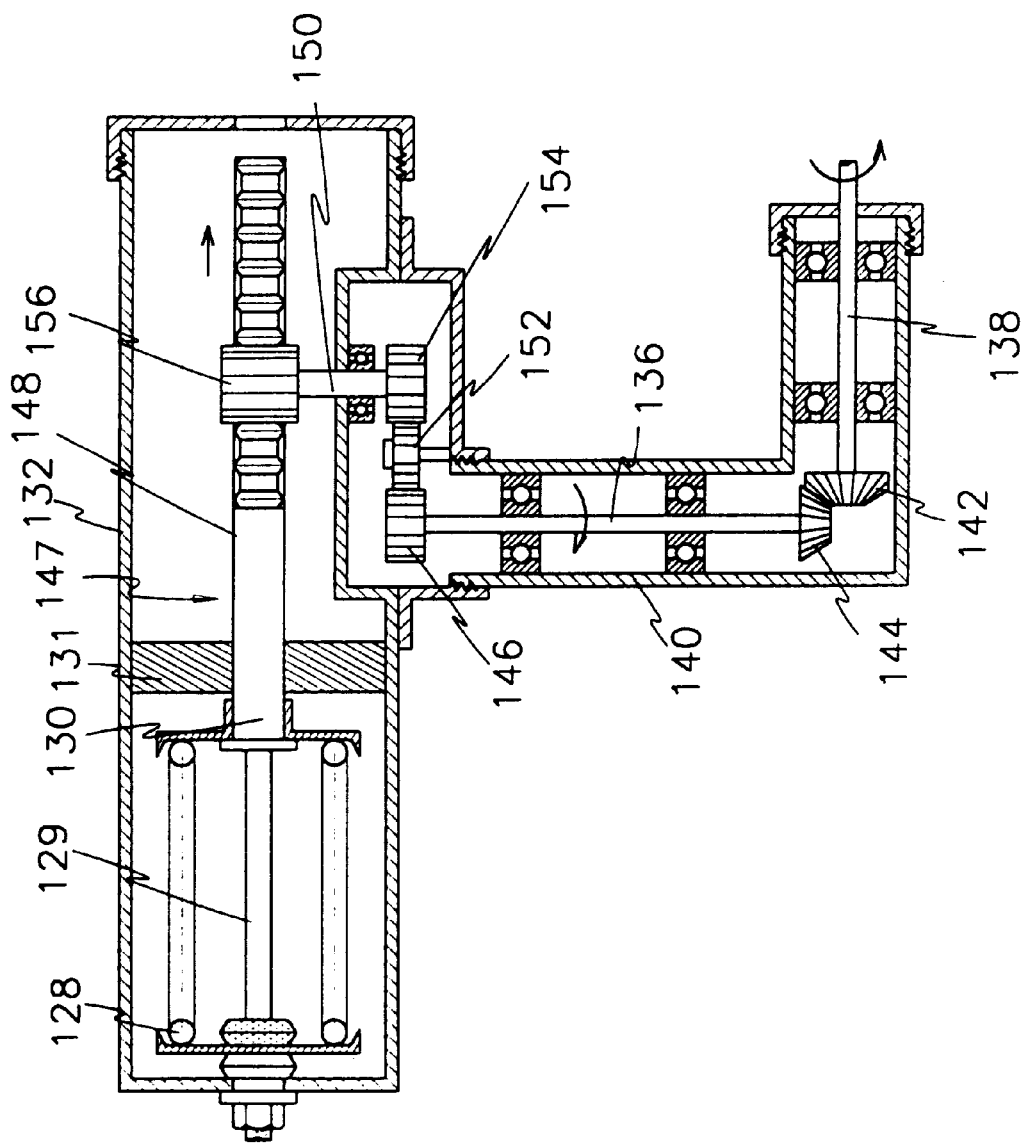
FIG. 10 is a sectional view similar to FIG. 8 for illustrating the operation of the damper during a rebound phase.
Figure 11:
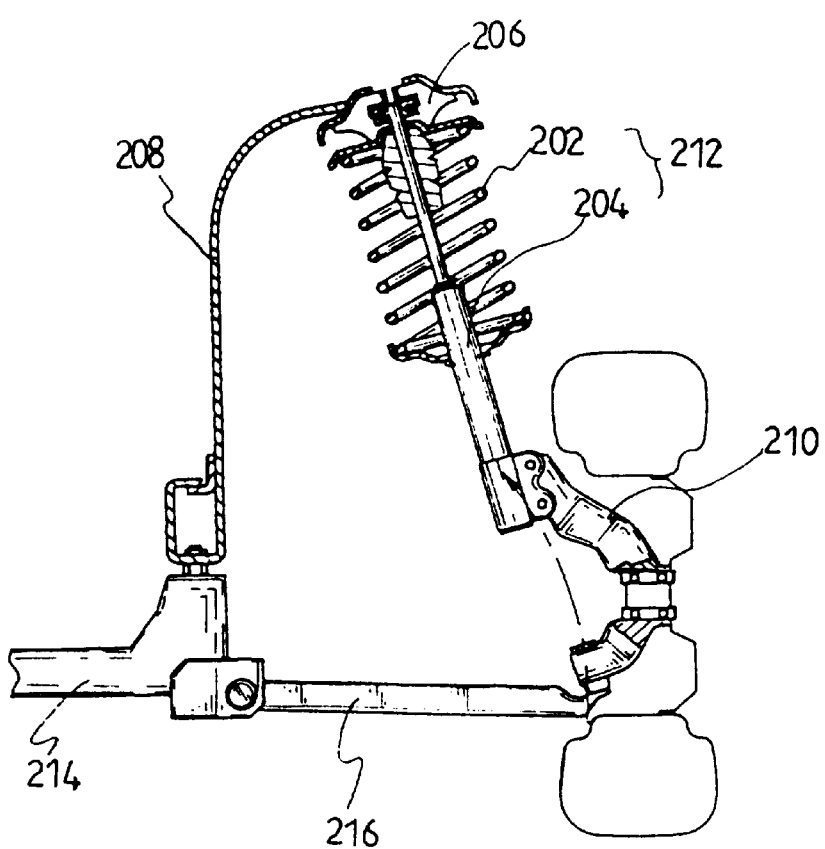
FIG. 11 is a front view of a conventional McPherson strut suspension system.

FIG. 10 shows a sectional view similar to FIG. 8 for illustrating the operation of the damper 108 during a rebound phase. Referring to FIGS. 6, 7 and 10, when the wheel 113 travels downward as a result of a depression in the surface of the road, the wheel carder 102 and the lower control arm 106 move downward together with the wheel 113. Accordingly, the end of the bar 138 extending into the lower casing 140 of the damper 108 rotates in a direction shown by the arrow in FIG. 10 such that the damper 108 operates in an fashion opposite to that described with reference to FIG. 9. As a result, the shock absorber 130 and the coil spring 28 rebound and act to provide downward force to the wheel 113, thereby applying vertical load on the surface of the wheel 113 contacting the road.

The above operation of the first damper 108 is continuously repeated as the vehicle is being driven, thereby fully absorbing shocks, and providing stability as a result of the vertical load maintained on the surface of the wheel contacting the road.

Here also, as in the first embodiment, different springs with differing spring rates can be used for the coil spring 128 of the damper 108 to vary the level of shock-absorbing strength and clearance of the vehicle. Accordingly, the first damper 108 can be made to be compatible to many different kinds of vehicles with different weights, and shock-absorbing and stability requirements.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A suspension system for vehicles comprising:
   a wheel carrier for rotatably supporting a wheel;
   an upper control arm having a first end connected to an upper end of the wheel carrier and a second end for pivotally connecting to a frame of the vehicle;
   a lower control arm having a first end connected to a lower end of the wheel career and a second end for extending toward the frame of the vehicle; and
   a damper for converting an up-and-down motion of the lower control-arm caused by shock transmitted from a road surface into a linear motion in a longitudinal direction of the vehicle and cushioning the linear motion, the damper being mounted on a side member and connected to the lower control arm, the damper comprising:
      an upper casing fixedly mounted to a side member of the frame, the upper casing being hollow,
      a lower casing integrally formed downward from a right end portion of the upper casing and having a bottom end bent toward the second end of the lower control arm, the lower casing being hollow,
      a first shaft fixedly connected to the second end of the lower control arm and extending into the bottom end of the lower casing, a first gear being formed on an end of the first shaft extending into the lower casing,
      a second shaft extending along a length of the lower casing and into the upper casing, and having a second gear formed on a bottom end thereof to mesh with the first gear of the first shaft and a pinion formed on a top end thereof,
      an elastic member provided in a leftward end of the upper casing, and
      a rack bar having a stopper on a left end and a rack portion on a right end, the stopper contacting a right end of the elastic member and the rack portion meshing with the pinion of the second shaft.

2. The suspension system of claim 1 wherein the elastic member is a coil spring.

3. The suspension system of claim 1 wherein the damper further comprises an inner casing mounted in the leftward end of the upper casing, the elastic member being provided in the inner casing.

4. The suspension system of claim 1 wherein the damper further comprises a disc-shaped piston of a predetermined thickness provided between the elastic member and the stopper of the rack bar.

5. A suspension system for vehicles comprising:
   a wheel carrier for rotatable supporting a wheel;
   an upper control arm having a first end connected to an upper end of the wheel carrier and a second end for pivotally connecting to a frame of the vehicle;
   a lower control arm having a first end connected to a lower end of the wheel career and a second end for extending toward the frame of the vehicle; and
   a damper for converting an up-and-down motion of the lower control arm caused by shock transmitted from a road surface into a linear motion in a longitudinal direction of the vehicle and cushioning the linear motion, the damper being mounted on a side member and connected to the lower control arm, the damper comprising:
      an upper casing fixedly mounted to a side member of the frame, the upper casing being hollow,
      a lower casing integrally formed downward from a right end portion of the upper casing and having a bottom end bent toward the lower control arm, the lower casing being hollow, a beam fixedly mounted on the lower control arm and extending into the bottom end of the lower casing, a first gear being formed on an end of the first shaft extending into the lower casing, a first shaft extending along a length of the lower casing and into the upper casing, and having a second gear formed on a bottom end thereof to mesh with the first gear of the beam and a third gear formed on a top end thereof, a fourth gear rotating on a shaft mounted to an interior of the damper and meshed with the third gear, a second shaft provided extending between the lower casing and the upper casing, and having a fifth gear on a lower end thereof meshing with the fourth gear and a pinion on an upper end thereof, an elastic member provided in a leftward end of the upper casing, and a shock absorber mounted in the upper casing and having a damper rod extending in a leftward direction to be fixed to a left end of the upper casing and a rack bar extending in a rightward direction such that a rack portion formed thereon meshes with the pinion of the second shaft, the damping rod of the shock absorber extending through a middle of the elastic member.

6. The suspension system of claim 5 wherein the elastic member is a coil spring.

7. The suspension system of claim 5 wherein a cavity is formed between the upper casing and the lower casing, the third gear of the first shaft, the fourth gear, and the fifth gear of the second shaft being provided in the cavity.

8. The suspension system of claim 5 wherein a guide member supports the shock absorber to enable the same to slide within the upper casing and prevent the shock absorber from sliding in a vertical direction.

* * * * *